US006473427B1

(12) United States Patent
Brodigan

(10) Patent No.: US 6,473,427 B1
(45) Date of Patent: Oct. 29, 2002

(54) ATM BASED VDSL COMMUNICATION SYSTEM HAVING META SIGNALING FOR SWITCHING A SUBSCRIBER BETWEEN DIFFERENT DATA SERVICE PROVIDERS

(75) Inventor: Donald L. Brodigan, Broomfield, CO (US)

(73) Assignee: Qwest Communications, Denver, CO (US)

( * ) Notice: Subject to any disclaimer, the term of this patent is extended or adjusted under 35 U.S.C. 154(b) by 197 days.

(21) Appl. No.: 09/664,665

(22) Filed: Sep. 19, 2000

Related U.S. Application Data

(63) Continuation of application No. 09/339,148, filed on Jun. 24, 1999.

(51) Int. Cl.[7] ............................................. H04L 12/28
(52) U.S. Cl. ....................................... 370/395; 370/352
(58) Field of Search ................................. 370/351, 352, 370/354, 355, 358, 395.1, 396, 397, 399, 395.2, 395.52, 395.53, 409

(56) References Cited

U.S. PATENT DOCUMENTS

| 5,756,280 A | * | 5/1998 | Soora et al. ................. 455/4.2 |
| 6,028,867 A | | 2/2000 | Rawson et al. |
| 6,044,403 A | | 3/2000 | Gerszberg et al. |
| 6,058,422 A | | 5/2000 | Ayanoglu et al. |
| 6,084,881 A | | 7/2000 | Fosmark et al. |
| 6,088,368 A | | 7/2000 | Rubinstain et al. |
| 6,101,182 A | | 8/2000 | Sistanizadeh et al. |

\* cited by examiner

Primary Examiner—Wellington Chin
Assistant Examiner—Brenda Pham
(74) Attorney, Agent, or Firm—Brooks & Kushman, P.C.

(57) ABSTRACT

An asynchronous transfer mode (ATM) based very-high-bit-rate digital subscriber line (VDSL) system for connecting a subscriber between different data service providers includes an ATM network connected to data service providers. A host digital terminal (HDT) is connected to the ATM network by an ATM permanent virtual circuit (PVC). Each of the ATM PVCs is associated with a corresponding one of the data service providers. The ATM PVCs connect the HDT to the data service providers. The HDT and the data service providers communicate data signals on the ATM PVCs through the ATM network. A customer provided equipment (CPE) data device is connected to the HDT by a VDSL PVC. The CPE device and the HDT communicate data signals on the VDSL PVC. A subscriber personal computer is connected to the CPE device for communicating data signals with the CPE device. The personal computer is operable to generate a channel signal corresponding to a selected one of the data service providers. The HDT, in response to the channel signal, connects the ATM PVC associated with the selected data service provider with the VDSL PVC to establish a system PVC connecting the selected data service provider with the personal computer. The selected data service provider and the personal computer communicate the data signals on the system PVC.

11 Claims, 2 Drawing Sheets

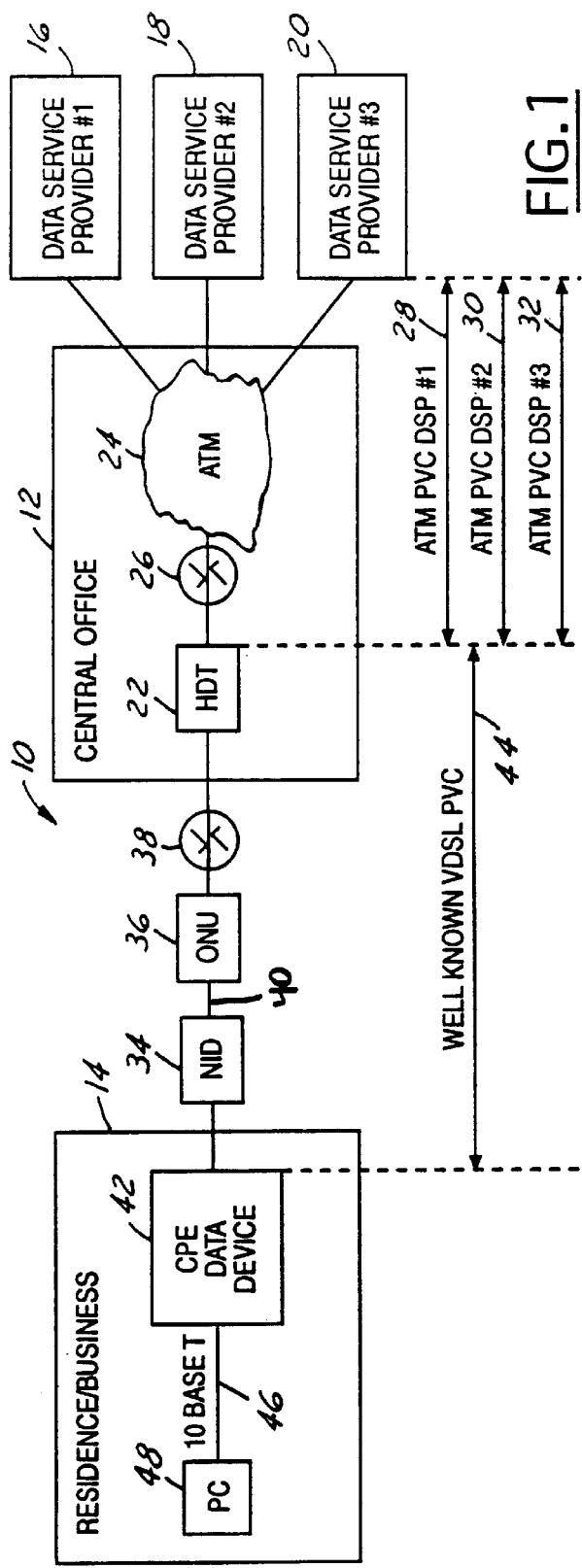
FIG. 1
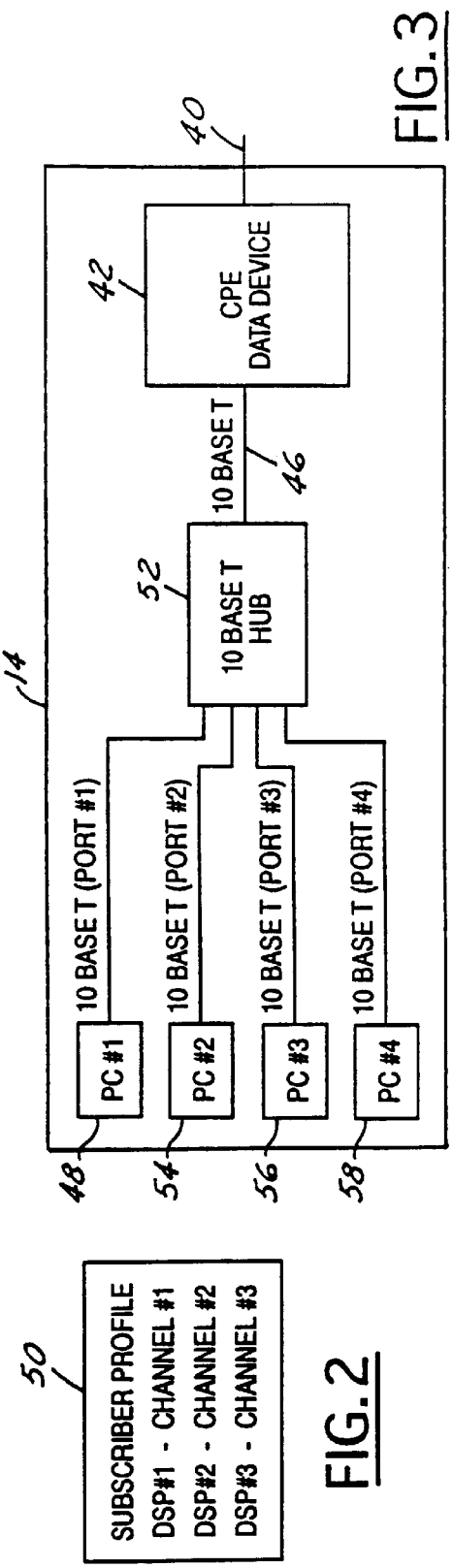
FIG. 2
FIG. 3

US 6,473,427 B1

ATM BASED VDSL COMMUNICATION SYSTEM HAVING META SIGNALING FOR SWITCHING A SUBSCRIBER BETWEEN DIFFERENT DATA SERVICE PROVIDERS

REFERENCE TO RELATED APPLICATION

This is a continuation of copending application Ser. No. 09/339,148 filed on Jun. 24, 1999.

TECHNICAL FIELD

The present invention relates generally to asynchronous transfer mode (ATM) based very-high-bit-rate digital subscriber line (VDSL) communication systems for providing data services and, more particularly, to an ATM based VDSL communication system having meta signaling for switching a subscriber to different data service providers via a single twisted pair drop connected to the subscriber.

BACKGROUND ART

An asynchronous transfer mode (ATM) based very-high-bit-rate digital subscriber line (VDSL) communication system includes an ATM network connected to a host digital terminal. The ATM network and the host digital terminal connect a data service provider to a subscriber over a system permanent virtual circuit (PVC). The data service provider provides services to the subscriber over the system PVC. The system PVC is a direct connection between the data service provider and the subscriber running through the ATM network and the host digital terminal. The system PVC consists of an ATM PVC between the data service provider and the ATM network and a VDSL PVC between the host digital terminal and the subscriber. The host digital terminal connects the ATM PVC and the VDSL PVC to establish the system PVC between the data service provider and the subscriber.

If the subscriber wishes to receive services from a second data service provider, the ATM based VDSL communication systems connects the second data service provider and the subscriber over a second system PVC. The second system PVC is a direct connection between the second data service provider and the subscriber running through the ATM network and the host digital terminal. The second system PVC consists of a second ATM PVC between the second data service provider and the ATM network and a second VDSL PVC between the host digital terminal and the subscriber. The host digital terminal connects the second ATM PVC with the second VDSL PVC to establish the second system PVC between the second data service provider and the subscriber.

A problem with having multiple system PVCs directly connecting data service providers with a subscriber is that a VDSL PVC is required for each system PVC. This is a problem because many subscriber residences and businesses only have one twisted pair link or drop which can only support one VDSL PVC to the host digital terminal. Thus, a subscriber can only be directly connected to one data service provider. Adding more twisted pair links for supporting multiple VDSL PVCs requires a massive undertaking and, in any event, multiple VDSL PVCs to the host digital terminal would consume the host digital terminal resources.

SUMMARY OF THE INVENTION

Accordingly, it is an object of the present invention to provide an asynchronous transfer mode (ATM) based very-high-bit-rate digital subscriber line (VDSL) communication system having meta signaling for switching a subscriber between different data service providers via a single twisted pair drop connected to the subscriber.

It is another object of the present invention to provide an ATM based VDSL communication system in which a subscriber can select a data service provider from a plurality of data service providers to connect an ATM PVC associated with the selected data service provider with a VDSL PVC of the subscriber to establish a system PVC connecting the subscriber and the selected data service provider.

It is a further object of the present invention to provide an ATM based VDSL communication system in which data service providers are switched to be individually connected to a VDSL PVC of a subscriber for connection to the subscriber.

In carrying out the above objects and other objects, the present invention provides an asynchronous transfer mode (ATM) based very-high-bit-rate digital subscriber line (VDSL) communication system for connecting a subscriber between different data service providers. The ATM based VDSL communication system includes an ATM network connected to a plurality of data service providers. A host digital terminal is connected to the ATM network by one of a plurality of ATM permanent virtual circuits. Each of the ATM permanent virtual circuits is associated with a corresponding one of the plurality of data service providers and is supported on a fiber optics link. The plurality of ATM permanent virtual circuits connect the host digital terminal to the plurality of data service providers. The host digital terminal and the plurality of data service providers communicate data signals on the plurality of ATM permanent virtual circuits through the ATM network. An optical network unit is connected to the host digital terminal by a fiber optics link.

A customer provided equipment (CPE) data device is connected through the optical network unit to the host digital terminal by a well known VDSL permanent virtual circuit. The well known VDSL permanent virtual circuit is supported on a fiber optics link between the host digital terminal and the optical network unit and a twisted pair drop between the optical network unit and the CPE data device. The CPE data device and the host digital terminal communicate data signals on the well known VDSL permanent virtual circuit. A subscriber personal computer is connected to the CPE data device for communicating data signals with the CPE data device. The subscriber personal computer is operable to generate a channel signal corresponding to a selected one of the plurality of data service providers. The host digital terminal, in response to the channel signal, connects the ATM permanent virtual circuits associated with the selected one of the data service providers with the well known VDSL permanent virtual circuit to establish a system PVC connecting the selected data service provider with the subscriber personal computer. The selected one of the data service providers and the subscriber personal computer communicate the data signals on the system PVC.

Further, in carrying out the above objects and other objects, the present invention provides another ATM based VDSL communication system for connecting a subscriber between different data service providers. This ATM based VDSL communication system differs from the ATM based VDSL communication system described above by including an ATM network having first and second ATM edge switches. The first ATM edge switch is connected to the plurality of data service providers and the host digital terminal is connected to the second ATM edge switch of the ATM network by one of the plurality of ATM permanent virtual circuits.

The above objects and other objects, features, and advantages of the present invention will be apparent from the following detailed description of the best mode for carrying out the invention when taken in connection with the accompanying drawings.

BRIEF DESCRIPTION OF DRAWINGS

FIG. 1 illustrates an ATM based VDSL communication system in accordance with a preferred embodiment of the present invention;

FIG. 2 illustrates a subscriber profile database contained in a host digital terminal of the ATM based VDSL communication system illustrated in FIG. 1;

FIG. 3 illustrates a 10baseT hub connecting multiple PCs to the CPE data device of the ATM based VDSL communication system illustrated in FIG. 1;

BEST MODE FOR CARRYING OUT THE INVENTION

Figure 4:
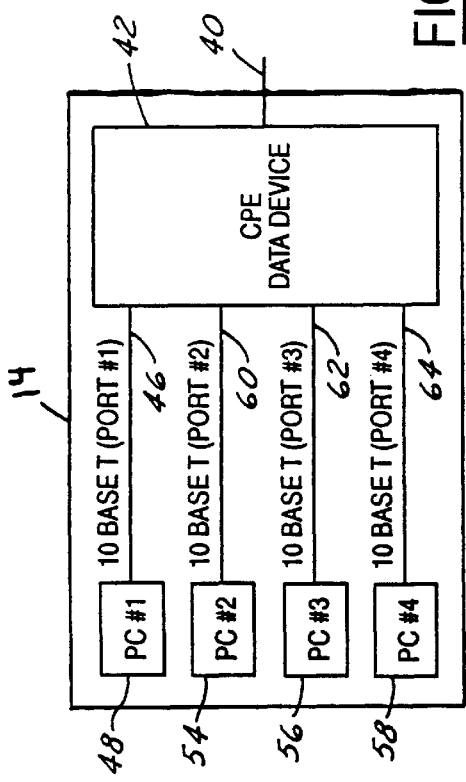
FIG. 4 illustrates multiple PCs connected directly by 10baseT ports to the CPE data device of the ATM based VDSL communication system illustrated in FIG. 1.

Referring now to FIG. 1, an asynchronous transfer mode (ATM) based very-high-bit-rate digital subscriber line (VDSL) communication system 10 in accordance with a preferred embodiment of the present invention is shown. ATM is a high bandwidth, low-delay, connection-oriented, packet-like switching and multiplexing technique. ATM transmissions are cell-based, with cells having a fixed length. Information is presented to the network asynchronously. However, the switches and interlinking transmission facilities are synchronized. Of course, it is to be appreciated that the term "asynchronous transfer mode" as used herein is meant to encompass equivalent network architectures in addition to traditional ATM.

VDSL services are of particular interest for a hybrid local loop scenario. In particular, communication system 10 is suitable for fiber-to-the-neighborhood (FTTN), fiber-to-the-curb (FTTC), and fiber-to-the-home (FTTH) distribution. The various distribution formats are collectively referred to as FTTX. Communication system 10 generally provides a private line like connection between a subscriber and a data service provider selected from a plurality of data service providers.

Communication system 10 includes a central office 12 connecting a subscriber 14 such as a residence or business to a selected data service provider DSP 16, 18, and 20. Central office 12 includes a host digital terminal (HDT) 22 and an ATM network 24 connected together by a fiber optics link 26. Each of data service providers 16, 18, and 20 includes an ATM switch (not specifically shown) for connecting to central office 12 via ATM network 24. Each of data service providers 16, 18, and 20 transmit and receive data signals to and from central office 12. Central office 12 transmits and receives these data signals to and from subscriber 14.

An ATM PVC 28 connects HDT 22 to data service provider 16 through ATM network 24. Data service provider 16 communicates with central office 12 through ATM PVC 28. HDT 22 selects ATM PVC 28 from a pool of available PVCs for data service provider 16. Data service provider 16 has its own service handle assigned to its ATM PVC termination at the HDT. A service handle identifies the data rates that the ATM PVC can handle. For instance, 256 Kbps or 1 Mbps. HDT 22 maintains the ATM parameters associated with ATM PVC 28. ATM PVC 28 can have various cell and bit rates such as constant bit rate (CBR), variable bit rate (VBR), available bit rate (ABR), and unspecified bit rate (UBR) which are maintained in a database of HDT 22. Using ATM PVC 28 allows data service provider 16 to control its own service applications, Internet Protocol (IP) addresses, and security issues transparently to the VDSL network connecting subscriber 14 to HDT 22.

Similarly, an ATM PVC 30 connects HDT 22 to data service provider 18 through ATM network 24 and an ATM PVC 32 connects the HDT to data service provider 20 through the ATM network. Like ATM PVC 28, ATM PVCs 30 and 32 have associated ATM parameters and data service providers 18 and 20 control their own service applications, Internet Protocol (IP) addresses, and security issues transparently to the VDSL network connecting subscriber 14 to HDT 22. In general, each data service provider 16, 18, and 20 has its own ATM PVC for communication with HDT 22.

Central office 12 and subscriber 14 communicate using VDSL through a network interface device (NID) 34 and an optical network unit (ONU) 36. A fiber optics link 38 connects HDT 22 to ONU 36. HDT 22 can support typically up to sixty four ONUs. ONU 36 converts optical signals to electronic signals to communicate with NID 34 via a twisted pair drop 40. ONU 36 can support typically up to thirty two drops. NID 34 connects to a customer provided equipment (CPE) data device 42 of subscriber 14. HDT 22 of central office 12 and CPE data device 42 of subscriber 14 communicate though a well known PVC 44 having a virtual path identifier (VPI) and a virtual channel identifier (VCI). Well known PVC 44 is a digital subscriber line (DSL) for HDT 22 and CPE data device 42 to communicate using VDSL. HDT 22 connects well known VDSL PVC 44 with one of ATM PVCs 28, 30, and 32 to establish a private line like connection, i.e., a system PVC, between subscriber 16 and the respective one of data service providers 16, 18, and 20.

CPE data device 42 has a 10baseT port 46 for communicating with a subscriber personal computer (PC) 48. 10baseT port 46 is associated with well known VDSL PVC 44. PC 48 transmits and receives data signals to and from CPE data device 42 through 10baseT port 46 for communication with a selected one of data service providers 16, 18, and 20. Data service providers 16, 18, and 20 are data information service providers such as America Online, Microsoft Network, corporate local access networks (LAN), etc. Data service providers 16, 18, and 20 communicate with PC 48 to provide data information services to subscriber 14. Communication with a selected one of data service providers 16, 18, and 20 takes place through the system PVC consisting of well known VDSL PVC 44 and the respective one of ATM PVCs 28, 30, and 32. PC has its own Internet Protocol (IP) address which is used by data service providers 16, 18, and 20 for communicating with PC 48.

Generally, one of data service providers 16, 18, and 20 are individually connected to PC 48 to transmit and receive data signals with PC 48 along a system PVC. For instance, subscriber 14 and data service provider 16 may be connected by a system PVC consisting of well known VDSL PVC 44 and ATM PVC 28. Well known VDSL PVC 44 connects PC 48 to HDT 22 and ATM PVC 28 connects data service provider 16 to HDT 22. HDT 22 then performs soft PVC switching to connect well known VDSL PVC 44 with ATM PVC 28 to establish the system PVC connecting PC 48 and data service provider 16. PC 48 may request data service provider 16 to provide data information such as a sports web page. In response, data service provider 16 provides PC 48 with access to the sports web page. PC 48 may then request different information from data service provider 16 such as a business web page. Data service provider 16 then provides PC 48 with access to the business web page. All of this communication between subscriber 14 and data service provider 16 takes place along the system PVC consisting of well known VDSL PVC 44 and ATM PVC 28.

Referring now to FIG. 2 with continuing reference to FIG. 1, HDT 22 includes a subscriber profile database 50. Subscriber profile database 50 contains a list of data service providers that subscriber 14 is entitled to receive data services. Each list of data service providers are associated with well known VDSL PVC 44. Each data service provider contained in database 50 has an associated channel. For instance, data service provider 16 is associated with channel one; data service provider 18 is associated with channel two; and data service provider 20 is associated with channel three. Each channel is associated with a respective ATM PVC 28, 30, and 32 connecting the associated data service provider 16, 18, and 20 to HDT 22. Each channel can be set to different data rates as the ATM parameters associated with ATM PVCs 28, 30, and 32 can be set accordingly.

Subscriber 14 can select to be connected from data service provider 16 to a different data service provider such as data service provider 18 by issuing a channel change request signal from PC 48 to CPE data device 42. The channel change request signal contains a designation to select channel two corresponding to data service provider 18. The channel change request signal includes the private IP address of CPE data device 42. CPE data device 42 intercepts the channel change request signal based on identifying its IP address before the channel change request signal is placed in well known VDSL PVC 44 for transmission to HDT 22. CPE data device 42 changes the channel change request signal to a standard digital storage media - command and control (DSM-CC) channel change request containing a channel two designation for data service provider 18 and an indication that PC 48 is requesting data service. HDT 22 of central office 12 receives the DSM-CC channel change request for data service with channel two designation, i.e., data service provider 18. HDT 22 then accesses database 50 to determine whether subscriber 14 is eligible to receive data services from data service provider 18. If so, HDT 22 then performs soft switching to replace ATM PVC 28 with ATM PVC 30 for connection to well known VDSL PVC 44 thereby establishing a second system PVC between data service provider 18 and subscriber 14 in place of the first system PVC between data service provider 16 and the subscriber. A third system PVC between data service provider 20 and subscriber 14 is established similarly after PC 48 issues another channel change request signal containing a designation to select channel three corresponding to data service provider 20.

In operation, subscriber 14 wishes to subscribe to multiple data service providers 16, 18, and 20 to receive data services from the data service providers. Each of data service providers 16, 18, and 20 has a data service handle assigned to its respective ATM PVC 28, 30, and 32 connection to HDT 22. The service handle is added to the subscriber's profile in database 50 in the same manner as a video channel is added to a subscriber video entitlement profile. Subscriber 14 then powers on CPE data device 42. CPE data device 42 then transmits a sign on request over a meta signaling channel to HDT 22 through well known VDSL PVC 44. HDT 22 then sets up a default system PVC between CPE data device 42 and data service provider 16. This system PVC consists of well known VDSL PVC 44 and ATM PVC 28 and is like a private line from subscriber 14 and data service provider 16. At this point, data is transferred between PC 48 via 10baseT port 46 to CPE data device 42. CPE data device 42 transmits the data to HDT 22 over well known VDSL PVC 44 for transmission to data service provider 16 over ATM PVC 28.

CPE data device 42 has a well known private IP address. If subscriber 14 wants to connect to data service provider 18 then the subscriber transmits from PC 48 a simple channel change request to CPE data device 42. CPE data device 42 changes this request to a standard DSM-CC channel change data signal containing channel two designation and then transmits the DSM-CC channel change data signal over a meta signaling channel to HDT 22. In response, HDT 22 replaces ATM PVC 28 with ATM PVC 30 to connect data service provider 18 to subscriber 14 over a new system PVC.

Referring now to FIG. 3 with continuing reference to FIG. 1, subscriber 14 includes a 10baseT hub 52 connecting first, second, third, and fourth PCs 48, 54, 56, and 58 to CPE data device 42. 10baseT hub 52 enables multiple PCs to communicate with selected data service providers over a common twisted pair drop 40. Each of PCs 48, 54, 56, and 58 have a unique media access control (MAC) address. The MAC address is like a serial number that allows the data service providers to track PCs 48, 54, 56, and 58 to a specific installed location. Each of PCs 48, 54, 56, and 58 can request a connection to a data service provider and then request a switch to a different data service provider if desired. Each of PCs 48, 54, 56, and 58 have an application programming interface (API) to recognize the channel change requests from other PCs and handle its own session accordingly and to reestablish its session with its data service provider by automatically transmitting a channel change request.

Referring now to FIG. 4 with continuing reference to FIG. 1, subscriber 14 includes a CPE data device 42 configured for supporting multiple 10baseT ports 46, 60, 62, and 64. PCs 48, 54, 56, and 58 are connected to CPE data device 42 via a respective 10baseT port 46, 60, 62, and 64. Each of 10baseT ports 46, 60, 62, and 64 has an associated well known VDSL PVC for transmission to central office 12 over twisted pair drop 40. Each of 10baseT ports 46, 60, 62, and 64 has its own data service provider default channel assigned. When one of 10baseT ports 46, 60, 62, and 64 receives a channel change request signal from its respective PC 48, 54, 56, and 58, CPE data device 42 transmits a DSM-CC channel change request to HDT 22. This DSM-CC channel change request includes information identifying the 10baseT port (port #1, port #2, port #3, or port #4). The ATM PVC associated with the 10baseT port selecting a channel change request will be switched to the ATM PVC connecting the selected data service provider to HDT 22. Multiple 10baseT ports provide a physical secure separation link between PCs. For instance, PC 48 may be connected to the Internet, PC 54 may be connected to a corporate network, PC 56 may be connected to an alarm service company, and PC 58 may be connected to a utility.

In general, by providing a way to switch using meta signaling switching the soft PVC at HDT 22, the subscriber IP addressing is controlled by subscriber 14 and data service providers 16, 18, and 20 making the VDSL network ATM transport transparent to public and private IP addresses allowing private line like access between the subscriber and the data service providers.

Figure 5:
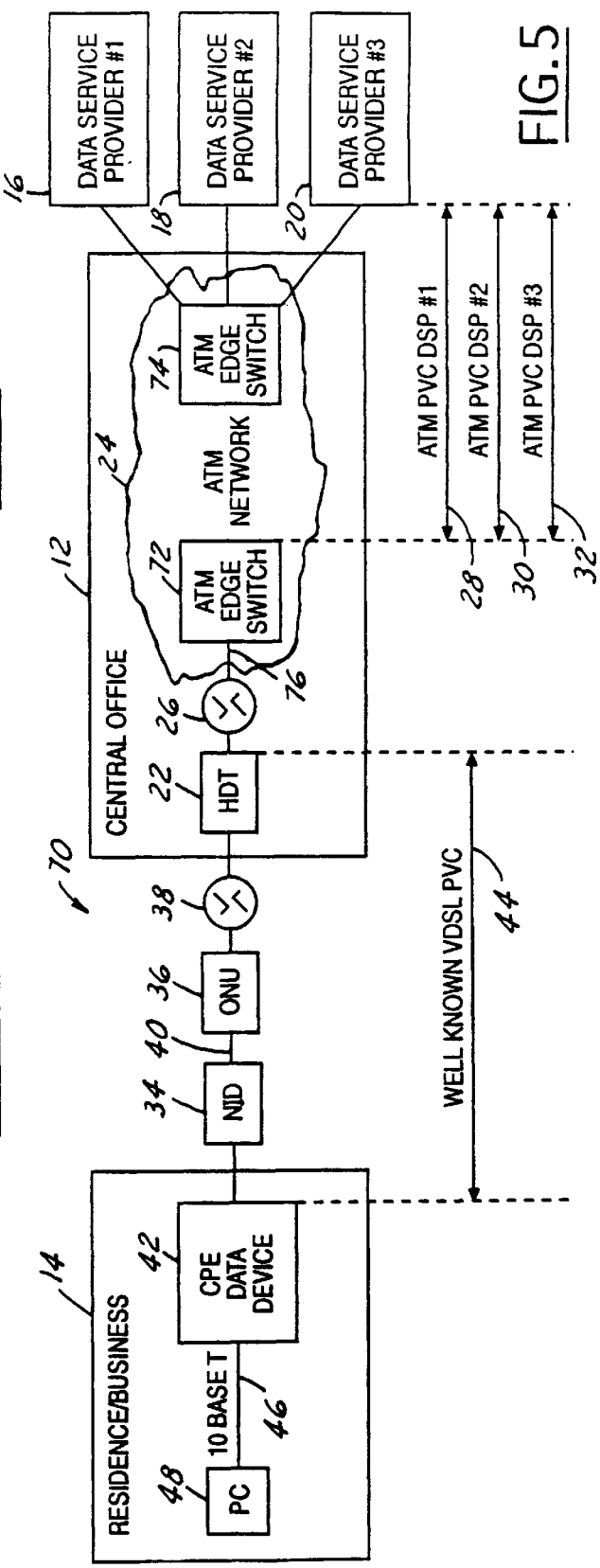
FIG. 5 illustrates an ATM based VDSL communication system in accordance with an alternate embodiment of the present invention.

Referring now to FIG. 5, an ATM based VDSL communication system 70 in accordance with an alternate embodiment of the present invention is shown. Communication system 70 has many of the same elements as communication system 10 and like elements have the same reference numerals. Communication system 70 generally differs from communication system 10 in that ATM network 24 includes ATM edge switches 72 and 74 for providing ATM local access network (LAN) switching to multiple data service providers 16, 18, and 20 using soft PVC on ATM network 24 to direct TCP/IP (Transmission Control Protocol/Internet Protocol) traffic to the destination data service provider. ATM edge switch 72 connects ATM network 24 to HDT 22 and ATM edge switch 74 connects data service providers 16, 18, and 20 to the ATM network. In general, communication system 70 provides an additional switching function than communication system 10.

Initially, a first soft PVC is established by HDT 22 as described above with reference to FIG. 1. By establishing a network PVC pool 76 connected to ATM edge switch 72 which supports LAN switching, a second soft PVC will be established over ATM network 24 to the data service provider 16, 18, and 20 assigned to that IP address. Subscriber 14 has complete control of the ATM PVC. If subscriber 14 wishes to connect to another data service provider 16, 18, and 20, then the subscriber transmits a TCP/IP packet to ATM edge switch 72 with the IP address of the selected data service provider. ATM network 24 then terminates the PVC from the current data service provider and establish the PVC to the selected data service provider. If CPE data device 42 is powered off for any reason, the soft PVC at HDT 22 will be disconnected from ATM edge switch 72 and ATM edge switch 72 will be signaled to disconnect the PVC over the ATM network. In general, communication system 70 enables subscriber 14 to establish and switch calls based on ATM Layer 3 IP addressing and maintain the secure ATM virtual path to many different data service providers.

Thus, it is apparent that there has been provided, in accordance with the present invention, an ATM based VDSL communication system for switching a subscriber between different data service providers that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An asynchronous transfer mode (ATM) based very-high-bit-rate digital subscriber line (VDSL) communication system for connecting a subscriber between different data service providers, the ATM based VDSL communication system comprising:

an ATM network connected to a plurality of data service providers;

a host digital terminal connected to the ATM network by one of a plurality of ATM permanent virtual circuits, each of the ATM permanent virtual circuits associated with a corresponding one of the plurality of data service providers, wherein the plurality of ATM permanent virtual circuits connect the host digital terminal to the plurality of data service providers; and a data device connected to the host digital terminal by a VDSL permanent virtual circuit, the VDSL permanent virtual circuit being supported on at least a twisted pair drop between the host digital terminal and the data device, wherein the data device is operable to generate a channel change signal corresponding to a selected one of the plurality of data service providers;

wherein the host digital terminal, in response to the channel change signal, connects the ATM permanent virtual circuit associated with the selected one of the data service providers with the VDSL permanent virtual circuit to establish a system permanent virtual circuit (PVC) connecting the selected one of the data service providers with the data device, wherein the selected one of the data service providers and the data device communicate data signals on the system PVC;

wherein the host digital terminal, upon receiving another channel change signal corresponding to a second data service provider, disconnects the VDSL permanent virtual circuit from the ATM permanent virtual circuit associated with the current one of the plurality of data service providers and connects the VDSL permanent virtual circuit with the ATM permanent virtual circuit associated with the second data service provider to establish a second system PVC.

2. The ATM based VDSL communication system of claim 1 wherein:

the host digital terminal includes a database of the data service providers in which the data device has access, wherein the host digital terminal, in response to the channel change signal, processes the database to determine if the data device has access to the selected one of the plurality of data service providers and, if the data device has access, connects the ATM permanent virtual circuit associated with the selected one of the data service providers with the VDSL permanent virtual circuit to establish a new system PVC.

3. The ATM based VDSL communication system of claim 1 wherein:

the data device transmits a digital storage media - command and control (DSMCC) signal on the VDSL permanent virtual circuit to the host digital terminal, the DSM-CC signal containing a designation indicative of the selected one of the plurality of data service providers.

4. The ATM based VDSL communication system of claim 3 wherein:

the data device transmits the DSM-CC signal to the host digital terminal over a meta signaling channel on the VDSL permanent virtual circuit.

5. The ATM based VDSL communication system of claim 1 wherein:

each of the ATM permanent virtual circuits have associated ATM parameters.

6. An asynchronous transfer mode (ATM) based very-high-bit-rate digital subscriber line (VDSL) communication system for connecting a subscriber between different data service providers, the ATM based VDSL communication system comprising:

an ATM network connected to a plurality of data service providers;

a host digital terminal connected to the ATM network by one of a plurality of ATM permanent virtual circuits, each of the ATM permanent virtual circuits associated with a corresponding one of the plurality of data service providers, wherein the plurality of ATM permanent virtual circuits connect the host digital terminal to the plurality of data service providers; and a data device connected to the host digital terminal by a VDSL permanent virtual circuit, the VDSL permanent virtual circuit being supported on at least a twisted pair drop between the host digital terminal and the data device, wherein the data device is operable to generate a channel change signal corresponding to a selected one of the plurality of data service providers;

wherein the host digital terminal, in response to the channel change signal, connects the ATM permanent virtual circuit associated with the selected one of the data service providers with the VDSL permanent virtual circuit to establish a system permanent virtual circuit (PVC) connecting the selected one of the data service providers with the data device, wherein the selected one of the data service providers and the data device communicate data signals on the system PVC;

wherein the data device has an Internet Protocol (IP) address, wherein the channel change signal includes the IP address of the data device, wherein the data device intercepts the channel change signal based on identifying its IP address and then transmits a digital storage media - command and control (DSM-CC) signal on the VDSL permanent virtual circuit to the host digital terminal, the DSM-CC signal containing a designation indicative of the selected one of the plurality of data service providers.

7. An asynchronous transfer mode (ATM) based very-high-bit-rate digital subscriber line (VDSL) communication system for connecting a subscriber between different data service providers, the ATM based VDSL communication system comprising:

an ATM network having first and second ATM edge switches, the first ATM edge switch connected to a plurality of data service providers;

a host digital terminal connected to the second ATM edge switch of the ATM network by one of a plurality of ATM permanent virtual circuits, each of the ATM permanent virtual circuits associated with a corresponding one of the plurality of data service providers, wherein the plurality of ATM permanent virtual circuits connect the host digital terminal to the plurality of data service providers; and a subscriber data device connected to the host digital terminal by a VDSL permanent virtual circuit, the VDSL permanent virtual circuit being supported on at least a twisted pair drop between the host digital terminal and the subscriber data device, wherein the subscriber data device is operable to generate a channel change signal corresponding to a selected one of the plurality of data service providers;

wherein the host digital terminal, in response to the channel change signal, connects the ATM permanent virtual circuit associated with the selected one of the data service providers with the VDSL permanent virtual circuit to establish a system permanent virtual circuit (PVC) connecting the selected one of the data service providers with the subscriber data device, wherein the selected one of the data service providers and the subscriber data device communicate data signals on the system PVC;

wherein the host digital terminal includes a database of the data service providers in which the subscriber data device has access, wherein the host digital terminal, in response to the channel change signal, processes the database to determine if the subscriber data device has access to the selected one of the plurality of data service providers and, if the subscriber data device has access, connects the ATM permanent virtual circuit associated with the selected one of the data service providers with the VDSL permanent virtual circuit to establish a new system PVC.

8. The ATM based VDSL communication system of claim 7 wherein:

the host digital terminal, upon receiving another channel change signal corresponding to a second data service provider, disconnects the VDSL permanent virtual circuit from the ATM permanent virtual circuit associated with the current one of the plurality of data service providers and connects the VDSL permanent virtual circuit with the ATM permanent virtual circuit associated with the second data service provider to establish a second system PVC.

9. The ATM based VDSL communication system of claim 7 wherein:

the subscriber data device transmits a digital storage media- command and control (DSM-CC) signal on the VDSL permanent virtual circuit to the host digital terminal, the DSM-CC signal containing a designation indicative of the selected one of the plurality of data service providers.

10. The ATM based VDSL communication system of claim 9 wherein:

the subscriber data device transmits DSM-CC signal to the host digital terminal over a meta signaling channel on the VDSL permanent virtual circuit.

11. The ATM based VDSL communication system of claim 7 wherein:

each of the ATM permanent virtual circuits have associated ATM parameters.

* * * * *